(12) United States Patent  
Nakazawa

(10) Patent No.: US 8,786,916 B2  
(45) Date of Patent: Jul. 22, 2014

(54) METHOD AND DEVICE FOR DRIVING LIGHT SOURCE, IMAGE READER, AND IMAGE FORMING APPARATUS

(75) Inventor: Masamoto Nakazawa, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 21 days.

(21) Appl. No.: 13/602,552

(22) Filed: Sep. 4, 2012

(65) Prior Publication Data

US 2013/0063792 A1    Mar. 14, 2013

(30) Foreign Application Priority Data

Sep. 13, 2011 (JP) .................................. 2011-199830

(51) Int. Cl.  
    *H04N 1/04*    (2006.01)
(52) U.S. Cl.  
    USPC ........... 358/475; 358/509; 358/488; 382/275; 348/222.1
(58) Field of Classification Search  
    CPC ............ H04N 2201/0471; H04N 2201/04734; H04N 2201/04744; H04N 9/3155; H04N 9/3129; H04N 2201/03158; H04N 2201/04767; H04N 9/3197; H04N 1/1135; H04N 2201/04729; H04N 2201/04731; H04N 2201/04787  
    USPC .................. 358/474, 475, 509, 501, 482, 483; 348/222.1, E05.024, 262, E09.009, 348/311, 335; 382/275  
    See application file for complete search history.

(56) References Cited

U.S. PATENT DOCUMENTS

| | | | | |
|---|---|---|---|---|
| 5,438,437 | A * | 8/1995 | Mizoguchi et al. ........... | 358/518 |
| 7,034,800 | B2 * | 4/2006 | Nakatsuka et al. ........... | 345/102 |
| 7,456,812 | B2 * | 11/2008 | Smith et al. ..................... | 345/82 |
| 7,486,326 | B2 * | 2/2009 | Ito et al. ......................... | 348/335 |
| 7,619,370 | B2 * | 11/2009 | Chemel et al. ................. | 315/291 |
| 7,652,682 | B2 * | 1/2010 | Ushio ............................ | 347/235 |
| 7,746,317 | B2 * | 6/2010 | Fu et al. ........................ | 345/102 |
| 7,924,262 | B2 * | 4/2011 | Chae ............................. | 345/102 |
| 8,035,697 | B2 * | 10/2011 | Onomura .................... | 348/223.1 |
| 8,035,707 | B2 * | 10/2011 | Shibazaki ..................... | 348/272 |
| 8,035,712 | B2 * | 10/2011 | Sonoda ......................... | 348/294 |
| 8,210,687 | B2 * | 7/2012 | Kobori et al. .................. | 353/52 |
| 8,300,283 | B2 * | 10/2012 | Tsai .............................. | 358/475 |
| 8,482,824 | B2 * | 7/2013 | Nagasaka ..................... | 358/509 |
| 8,493,425 | B2 * | 7/2013 | Furuta .......................... | 347/233 |
| 8,520,095 | B2 * | 8/2013 | Uchida ....................... | 348/230.1 |
| 8,624,886 | B2 * | 1/2014 | Uehara ......................... | 345/207 |
| 8,664,888 | B2 * | 3/2014 | Nuhfer et al. ................. | 315/291 |
| 8,680,787 | B2 * | 3/2014 | Veskovic ...................... | 315/307 |
| 2011/0051201 | A1 | 3/2011 | Hashimoto et al. | |
| 2011/0063488 | A1 | 3/2011 | Nakazawa | |

FOREIGN PATENT DOCUMENTS

JP         08-069215        3/1996

* cited by examiner

*Primary Examiner* — Negussie Worku  
(74) *Attorney, Agent, or Firm* — Oblon, Spivak, McClelland, Maier & Neustadt, L.L.P.

(57) ABSTRACT

A light-source driving device includes a driving unit configured to drive a light source unit that emits light onto an object; and a driving control unit configured to control the driving unit to drive the light source unit in a first driving mode and a second driving mode. A light emission time of the light source unit is controlled in the first driving mode. An instantaneous value of a quantity of light of the light source unit being controlled in the second driving mode.

20 Claims, 8 Drawing Sheets

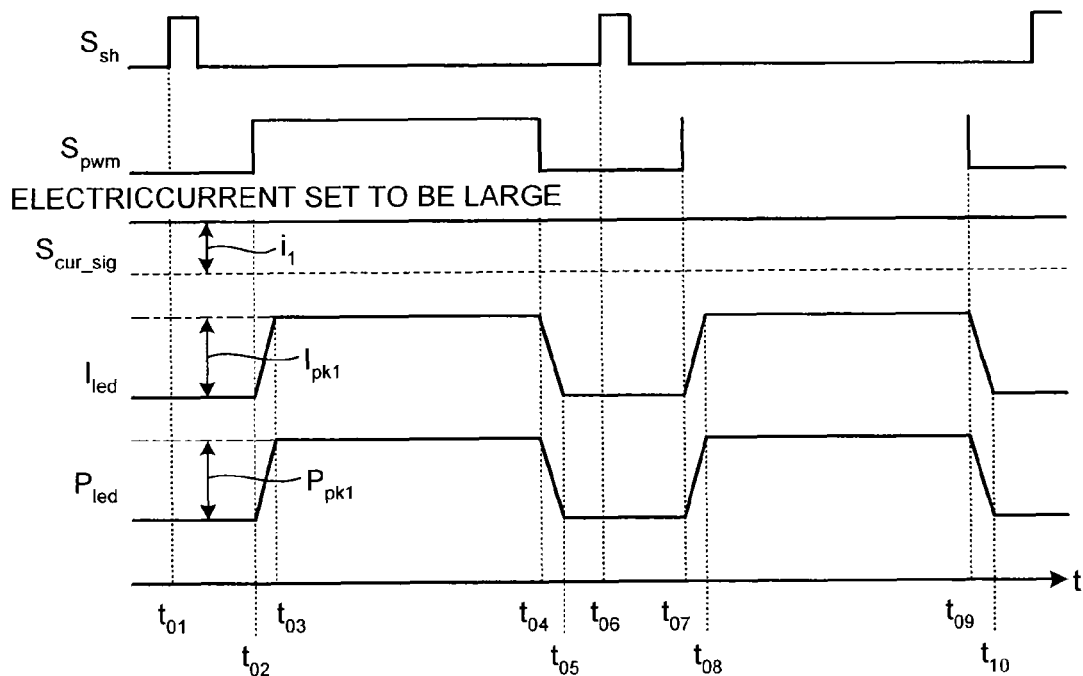
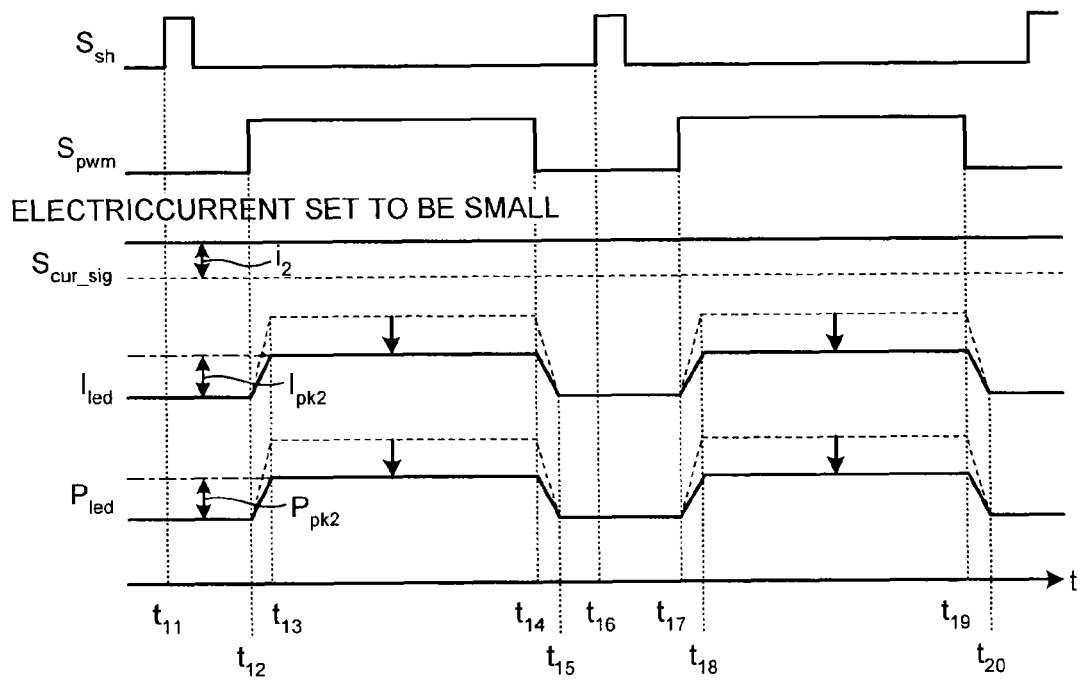

METHOD AND DEVICE FOR DRIVING LIGHT SOURCE, IMAGE READER, AND IMAGE FORMING APPARATUS

CROSS-REFERENCE TO RELATED APPLICATION

The present application claims priority to and incorporates by reference the entire contents of Japanese Patent Application No. 2011-199830 filed in Japan on Sep. 13, 2011.

BACKGROUND OF THE INVENTION

1. Field of the Invention

The present invention relates to a method and a device for driving a light source, an image reader, and an image forming apparatus.

2. Description of the Related Art

Image readers such as scanners typically employ a light emitting diode (LED) as a light source in recent years. LEDs vary greatly from one LED to another in light quantity emitted therefrom. Accordingly, an image reader generally performs image scanning by emitting light of which quantity is adjusted on an LED-by-LED basis onto a document.

There are two major schemes for adjusting the quantity of light emitted from an LED: an electric-current value control scheme (hereinafter, "current value control scheme") and a light emission time control scheme (also referred to as pulse width modulation (PWM) scheme). The current value control scheme is disadvantageous in that image quality of an image obtained by scanning is unstable because luminescent chromaticity of an LED greatly depends on an electric current supplied to the LED. Accordingly, image readers generally employ the light emission time control scheme.

Meanwhile, image readers have a function of pre-scanning a document to detect a size in the main-scanning direction of the document. This detection of the size in the main-scanning direction is performed when a user has placed the document on the image reader, such as when a platen for pressing the document is closed. There arises a problem at this time that the user is dazzled by light emitted from an LED onto the document during pre-scanning performed by the image reader.

In this regard, a technique related to an image reader including LEDs as a light source is disclosed in Japanese Patent Application Laid-open No. H8-069215. According to this technique, the quantity of light emitted onto a document during pre-scanning is controlled to be smaller than that during normal document scanning.

However, the conventional technique is disadvantageous in that when the PWM scheme is used to control the light quantity of the LED, a peak value of the light quantity during pre-scanning cannot be reduced, and therefore glare that dazzles the user cannot be reduced. The reason for this is as follows. Although a human eye is dazzled by glare at a peak value of the light quantity of the LED, the user remains to be dazzled by glare of afterimage for a while even after the quantity of light emitted from the LED becomes lower than the peak value.

When the current value control is used to control the quantity of light emitted from the LED, not only image quality of an image obtained by scanning a document is unstable but also luminescent chromaticity of the LED fluctuates. Accordingly, it is substantially impossible to reduce glare that dazzles a user during pre-scanning.

Therefore, there is a need for a device and a method capable of increasing stability of image quality of an image obtained by normal document scanning and also reduce glare that dazzles a user during pre-scanning.

SUMMARY OF THE INVENTION

It is an object of the present invention to at least partially solve the problems in the conventional technology.

According to an embodiment, there is provided a light-source driving device that includes a driving unit configured to drive a light source unit that emits light onto an object; and a driving control unit configured to control the driving unit to drive the light source unit in a first driving mode and a second driving mode. A light emission time of the light source unit is controlled in the first driving mode. An instantaneous value of a quantity of light of the light source unit is controlled in the second driving mode.

According to another embodiment, there is provided an image reader that includes a light source unit configured to emit light onto an object; a driving unit configured to drive the light source unit; a generating unit configured to generate a control signal for controlling driving of the light source unit; a driving control unit configured to control the driving unit to drive the light source unit in a first driving mode and a second driving mode based on the control signal generated by the generating unit. A light emission time of the light source unit is controlled in the first driving mode. An instantaneous value of a quantity of light of the light source unit is controlled in the second driving mode. The image reader also includes a photoelectric converter configured to convert an accumulated quantity of reflected light from the object to which the light source unit emits light into electric energy for each of the first driving mode and the second driving mode. The accumulated quantity of light is accumulated during a charge storage time that depends on a corresponding one of the first driving mode and the second driving mode.

According to still another embodiment, there is provided an image forming apparatus that includes the image reader according to the above embodiment.

According to still another embodiment, there is provided a light-source driving method to be performed by an image reader. The light-source driving method includes generating a control signal for controlling driving of a light source unit of the image reader, the light source unit emitting light onto a document; performing driving control by controlling a driving unit of the image reader based on the generated control signal generated to drive the light source unit in a first driving mode and a second driving mode, a light emission time of the light source unit being controlled in the first driving mode, an instantaneous value of a quantity of light of the light source unit being controlled in the second driving mode; and performing photoelectric conversion by converting an accumulated quantity of reflected light from the document to which the light source unit emits light into electric energy for each of the first driving mode and the second driving mode, the accumulated quantity of light being accumulated during a charge storage time that depends on a corresponding one of the first driving mode and the second driving mode.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2A is a diagram illustrating an example of operations to be performed during normal document scanning by the light-source driving device according to the first embodiment;

FIG. 2B is a diagram illustrating an example of operations to be performed during pre-scanning by the light-source driving device according to the first embodiment;

DETAILED DESCRIPTION OF THE PREFERRED EMBODIMENTS

Exemplary embodiments of the present invention are described below with reference to the accompanying drawings. Light-source driving devices each being for use in an image reader, and image readers each being for use in an image forming apparatus are described below to illustrate the embodiments. However, applications of the light-source driving devices and the image readers are not limited to those described below, but they are applicable to various types of image forming apparatuses that output an image on an image forming medium. The embodiments described below may be combined appropriately.

First Embodiment

Figure 1:
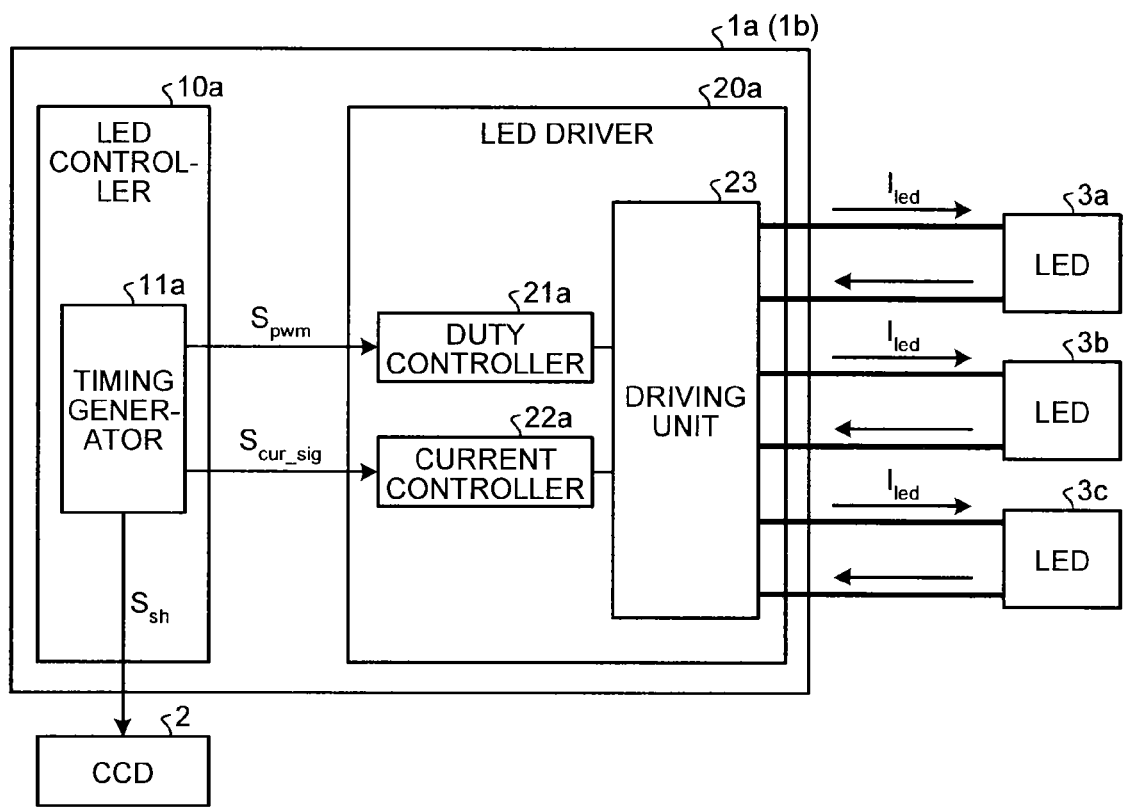
FIG. 1 is a block diagram illustrating an exemplary configuration of a light-source driving device according to a first embodiment of the present invention.

A light-source driving device $1a$ according to a first embodiment of the present invention is described below. FIG. 1 is a block diagram illustrating an exemplary configuration of the light-source driving device $1a$ according to the first embodiment. As illustrated in FIG. 1, the light-source driving device $1a$ includes an LED controller $10a$ and an LED driver $20a$.

Connected to the light-source driving device $1a$ are a charge coupled device image sensor (CCD) 2 and light emitting diodes (LEDs) $3a$ to $3c$. The CCD 2 is an example of a photoelectric converter that receives reflected light, which is emitted from the LEDs $3a$ to $3c$ onto an object and reflected from the subject, and converts the received reflected light into electric energy. The object is a document placed on an image reader, for example. In this example, the three LEDs, or, more specifically, the LEDs $3a$ to $3c$, are connected to the light-source driving device $1a$; however, the number of the LEDs connected to the light-source driving device $1a$ can be other than three. The LEDs $3a$ to $3c$ are an example of a light source unit that emits light onto the object.

The LED controller $10a$ includes a timing generator $11a$. The timing generator $11a$ generates a light emission time signal $S_{pwm}$ for controlling a light emission time of the LEDs $3a$ to $3c$ using a light emission time control (hereinafter, "PWM scheme") and outputs the light emission time signal $S_{pwm}$ to the LED driver $20a$. A pulse width of a pulse signal is variable in the PWM scheme. The timing generator $11a$ generates an electric-current control signal $S_{cur\_sig}$ that sets an electric-current setting value of an electric current to be supplied to the LEDs $3a$ to $3c$ and outputs the electric-current control signal $S_{cur\_sig}$ to the LED driver $20a$.

The timing generator $11a$ generates a shift gate signal $S_{sh}$ for controlling transfer of charges stored in the CCD 2 to a transfer register (not shown) and outputs the shift gate signal $S_{sh}$ to the CCD 2. A signal cycle of the shift gate signal $S_{sh}$ corresponds to a charge storage time of the CCD 2.

The LED driver $20a$ includes a duty controller $21a$, a current controller $22a$, and a driving unit 23. The duty controller $21a$ outputs a light-on signal that controls the light emission time of the LEDs $3a$ to $3c$ using the PWM scheme based on the light emission time signal $S_{pwm}$ output from the timing generator $11a$ to the driving unit 23. The current controller $22a$ outputs an electric-current setting value that sets the electric current value to be supplied to the LEDs $3a$ to $3c$ using the current value control based on the electric-current control signal $S_{cur\_sig}$ output from the timing generator $11a$ to the driving unit 23.

The driving unit 23 includes a power source (not shown). The driving unit 23 supplies an electric current $I_{led}$ to each of the LEDs $3a$ to $3c$ so that the LEDs $3a$ to $3c$ are lit. FIG. 1 illustrates a case where the LEDs $3a$ to $3c$ are supplied with electric currents from different power supplying systems; however, power supplying system(s) that supplies electric currents to the LEDs $3a$ to $3c$ may be integrated or distributed differently.

More superficially, the driving unit 23 controls the light emission time, or, put another way, on and off, of the LEDs $3a$ to $3c$ based on the light-on signal output from the duty controller $21a$. A mode where the driving unit 23 controls the light emission time of the LEDs $3a$ to $3c$ based on the light-on signal output from the duty controller $21a$ is referred to as a first driving mode. In the image reader according to the first embodiment, the quantity of light emitted from the LEDs $3a$ to $3c$ onto a document during normal document scanning is controlled by controlling the light emission time of the LEDs $3a$ to $3c$ in the first driving mode.

The driving unit 23 also controls an instantaneous value of the quantity of light emitted from the LEDs $3a$ to $3c$ based on the electric-current setting value output from the current controller $22a$. A mode where the driving unit 23 controls the light-quantity instantaneous value of the LEDs $3a$ to $3c$ based on the electric-current setting value output from the current controller $22a$ is referred to as a second driving mode. In the image reader according to the first embodiment, the quantity of light emitted from the LEDs $3a$ to $3c$ onto a document during pre-scanning is controlled by controlling the light-quantity instantaneous value of the LEDs $3a$ to $3c$ in the second driving mode.

The driving unit 23 controls light emission from the LEDs 3a to 3c in the first driving mode and the second driving mode as described above. Note that any index value of the light quantity, such as a light-emission brightness level, luminous intensity, or luminous flux density, can be used in a similar manner as the light-quantity instantaneous value of the LEDs 3a to 3c.

FIG. 2A is a diagram illustrating an example of operations to be performed during normal document scanning by the light-source driving device 1a according to the first embodiment. FIG. 2B is a diagram illustrating an example of operations to be performed during pre-scanning by the light-source driving device 1a according to the first embodiment. FIGS. 2A and 2B are timing diagrams, in which a horizontal axis represents time t, that schematically illustrate the shift gate signal $S_{sh}$, the light emission time signal $S_{pwm}$, the electric-current control signal $S_{cur\_sig}$, the electric current $I_{led}$, and a light-quantity instantaneous value Pled at each time t.

As illustrated in FIG. 2A, the electric-current control signal $S_{cur\_sig}$ is set at an electric-current setting value $i_1$ for a full period of time t during normal document scanning. Before time $t_{01}$, the LEDs 3a to 3c are in a light-off state where the shift gate signal $S_{sh}$, the light emission time signal $S_{pwm}$, the electric current $I_{led}$, and the light-quantity instantaneous value $P_{led}$ are in their initial states.

First, a pulse of the shift gate signal $S_{sh}$ goes high at time $t_{01}$ illustrated in FIG. 2A. Subsequently, a pulse of the light emission time signal $S_{pwm}$ goes high at time $t_{02}$. In response to the pulse rise of the light emission time signal $S_{pwm}$, the electric current $I_{led}$ and the light-quantity instantaneous value $P_{led}$ start rising at time $t_{02}$. The electric current $I_{led}$ rises $I_{pk1}$ that depends on the electric-current setting value $i_1$ over a period from time $t_{02}$ to time $t_{03}$. Similarly, the light-quantity instantaneous value $P_{led}$ rises $P_{pk1}$ that depends on the electric-current setting value $i_1$ over the period from time $t_{02}$ to time $t_{03}$.

More specifically, the LEDs 3a to 3c start lighting at time $t_{02}$ illustrated in FIG. 2A so as to be in a state where the LEDs 3a to 3c emit light according to $I_{pk1}$ and $P_{pk1}$ at time $t_{03}$. $I_{pk1}$ and $P_{pk1}$ are a peak value of the electric current $I_{led}$ and a peak value of the light-quantity instantaneous value $P_{led}$, respectively, in a state where the electric-current control signal $S_{cur\_sig}$ is set at the electric-current setting value $i_1$. The LEDs 3a to 3c emit light according to $I_{pk1}$ and $P_{pk1}$ for a period from time $t_{03}$ to time $t_{04}$.

The pulse of the light emission time signal $S_{pwm}$ goes low at time $t_{04}$ illustrated in FIG. 2A. In response to the pulse fall of the light emission time signal $S_{pwm}$, the electric current $I_{led}$ and the light-quantity instantaneous value $P_{led}$ start falling at time $t_{04}$. The electric current $I_{led}$ falls $I_{pk1}$ over a period from time $t_{04}$ to time $t_{05}$. Similarly, the light-quantity instantaneous value $P_{led}$ falls $P_{pk1}$ over the period from time $t_{04}$ to time $t_{05}$.

More specifically, the LEDs 3a to 3c start stopping lighting at time $t_{04}$ illustrated in FIG. 2A so as to be in a light-off state at time $t_{05}$. Operations in a period from time $t_{06}$ to $t_{10}$ illustrated in FIG. 2A are similar to those in a period from time $t_{01}$ to time $t_{05}$.

On the other hand, as illustrated in FIG. 2B, the electric-current control signal $S_{cur\_sig}$ is set at an electric-current setting value $i_2$ that is smaller than the electric-current setting value $i_1$ illustrated in FIG. 2A for a full period of time t during pre-scanning. Before time $t_{11}$, the LEDs 3a to 3c are in the light-off state where the shift gate signal $S_{sh}$, the light emission time signal $S_{pwm}$, the electric current $I_{led}$, and the light-quantity instantaneous value $P_{led}$ are in their initial states.

The pulse of the shift gate signal $S_{sh}$ goes high at time $t_{11}$ illustrated in FIG. 2B. Subsequently, the pulse of the light emission time signal $S_{pwm}$ goes high at time $t_{12}$. In response to the pulse rise of the light emission time signal $S_{pwm}$, the electric current $I_{led}$ and the light-quantity instantaneous value $P_{led}$ start rising at time $t_{12}$. The electric current $I_{led}$ rises $I_{pk2}$ which is smaller than $I_{pk1}$ and depends on the electric-current setting value $i_2$ over a period from time $t_{12}$ to time $t_{13}$. Similarly, the light-quantity instantaneous value $P_{led}$ rises $P_{pk2}$ which is smaller than $P_{pk1}$ and depends on the electric-current setting value $i_2$ over the period from time $t_{12}$ to time $t_{13}$.

More specifically, the LEDs 3a to 3c start lighting at time $t_{12}$ illustrated in FIG. 2B so as to be in a state where the LEDs 3a to 3c emit light according to $I_{pk2}$ and $P_{pk2}$ at time $t_{13}$. $I_{pk2}$ and $P_{pk2}$ are a peak value of the electric current $I_{led}$ and a peak value of the light-quantity instantaneous value $P_{led}$, respectively, in a state where the electric-current control signal $S_{cur\_sig}$ is set at the electric-current setting value $i_2$. The LEDs 3a to 3c emit light according to $I_{pk2}$ and $P_{pk2}$ for a period from time $t_{13}$ to time $t_{14}$.

The pulse of the light emission time signal $S_{pwm}$ goes low at time $t_{14}$ illustrated in FIG. 2B. In response to the pulse fall of the light emission time signal $S_{pwm}$, the electric current $I_{led}$ and the light-quantity instantaneous value $P_{led}$ start falling at time $t_{14}$. The electric current $I_{led}$ falls $I_{pk2}$ over a period from time $t_{14}$ to time $t_{15}$. Similarly, the light-quantity instantaneous value $P_{led}$ falls $P_{pk2}$ over the period from time $t_{14}$ to time $t_{15}$.

More specifically, the LEDs 3a to 3c start stopping lighting at time $t_{14}$ illustrated in FIG. 2B so as to be in the light-off state at time $t_{15}$. Operations from time $t_{16}$ to $t_{20}$ illustrated in FIG. 2B are similar to those from time $t_{11}$ to time $t_{15}$.

As described above, the light-source driving device 1a according to the first embodiment controls the light emission time of the LEDs 3a to 3c in the first driving mode based on the PWM scheme, and controls the light-quantity instantaneous value of the LEDs 3a to 3c in the second driving mode based on the current value control. The light emission time of the LEDs 3a to 3c based on the PWM scheme during normal document scanning and that during pre-scanning are equal to each other.

During normal document scanning or the like where a sufficient quantity of light is required, the electric-current control signal $S_{cur\_sig}$ for the current value control is set at the electric-current setting value $i_1$ so that the light-quantity instantaneous value $P_{led}$ peaks at $P_{pk1}$, and the light emission time of the LEDs 3a to 3c is controlled using the PWM scheme. On the other hand, during pre-scanning or the like where a sufficient quantity of light is not required, the electric-current control signal $S_{cur\_sig}$ for the current value control is set at the electric-current setting value $i_2$ that is smaller than the electric-current setting value $i_1$ so that the light-quantity instantaneous value $P_{led}$ peaks at $P_{pk2}$, and the light emission time of the LEDs 3a to 3c is controlled using the PWM scheme.

As described above, the light-source driving device 1a according to the first embodiment controls the light emission time of the LEDs 3a to 3c in response to a condition by selectively using one of the first driving mode based on the PWM scheme and the second driving mode based on the current value control. Accordingly, stability of image quality of an image obtained by scanning a document is increased because stability of luminescent chromaticity of the LEDs 3a to 3c is increased during normal document scanning, while glare of light from the LEDs 3a to 3c is reduced during pre-scanning because the quantity of light emitted from the LEDs 3a to 3c is reduced.

Second Embodiment

Operations of Light-Source Driving Device

Figure 3:
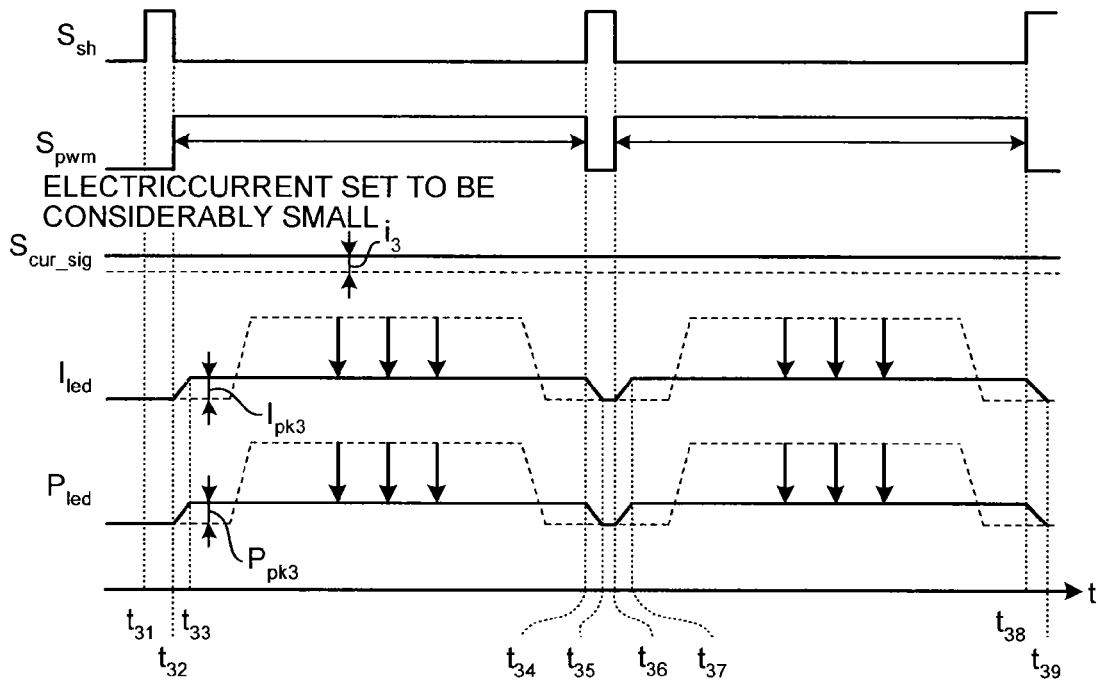
FIG. 3 is a diagram illustrating an example of operations to be performed during pre-scanning by a light-source driving device according to a second embodiment of the present invention.

A light-source driving device 1b according to a second embodiment of the present invention is described below. The configuration and operations of the light-source driving device 1b are similar to those of the light-source driving device 1a according to the first embodiment, and repeated description is omitted. FIG. 3 is a diagram illustrating an example of operations to be performed during pre-scanning by the light-source driving device 1b according to the second embodiment. FIG. 3 is a timing diagram, in which a horizontal axis represents time t, that schematically illustrates the shift gate signal $S_{sh}$, the light emission time signal $S_{pwm}$, the electric-current control signal $S_{cur\_sig}$, the electric current $I_{led}$, and the light-quantity instantaneous value $P_{led}$ at each time t as do FIGS. 2A and 2B.

An electric-current setting value $i_3$ of the electric-current control signal $S_{cur\_sig}$ used in the light-source driving device 1b during pre-scanning illustrated in FIG. 3 is smaller than the electric-current setting value $i_2$ of the electric-current control signal $S_{cur\_sig}$ of the light-source driving device 1a illustrated in FIG. 2B. Accordingly, the light-source driving device 1b performs control so as to make the light emission time signal $S_{pwm}$ longer than that during pre-scanning of the light-source driving device 1a illustrated in FIG. 2B using the PWM scheme so that a sufficient quantity of light is emitted from the LEDs 3a to 3c during pre-scanning.

As illustrated in FIG. 3, the electric-current control signal $S_{cur\_sig}$ is set at the electric-current setting value $i_3$ for a full period of time t during pre-scanning. Before time $t_{31}$, the LEDs 3a to 3c are in the light-off state where the shift gate signal $S_{sh}$, the light emission time signal $S_{pwm}$, the electric current $I_{led}$, and the light-quantity instantaneous value $P_{led}$ are in their initial states.

The pulse of the shift gate signal $S_{sh}$ goes high at time $t_{31}$ illustrated in FIG. 3. Subsequently, the pulse of the shift gate signal $S_{sh}$ goes low at time $t_{32}$ and simultaneously the pulse of the light emission time signal $S_{pwm}$ goes high. In response to the pulse rise of the light emission time signal $S_{pwm}$, the electric current $I_{led}$ and the light-quantity instantaneous value $P_{led}$ start rising at time $t_{32}$. The electric current $I_{led}$ rises Ipk3 which is smaller than $I_{pk1}$ illustrated in FIGS. 2A and $I_{pk2}$ illustrated in FIG. 2B and depends on the electric-current setting value $i_3$ over a period from time $t_{32}$ to time $t_{33}$. Similarly, the light-quantity instantaneous value $P_{led}$ rises $P_{pk3}$ which is smaller than $P_{pk1}$ and $P_{pk2}$ and depends on the electric-current setting value $i_3$ over the period from time $t_{32}$ to time $t_{33}$.

More specifically, the LEDs 3a to 3c start lighting at time $t_{32}$ illustrated in FIG. 3 so as to be in a state where the LEDs 3a to 3c emit light according to $I_{pk3}$ and $P_{pk3}$ at time $t_{33}$. $I_{pk3}$ and $P_{pk3}$ are a peak value of the electric current $I_{led}$ and a peak value of the light-quantity instantaneous value $P_{led}$, respectively, in a state where the electric-current control signal $S_{cur\_sig}$ is set at the electric-current setting value $i_3$. The LEDs 3a to 3c emit light according to $I_{pk3}$ and $P_{pk3}$ for a period from time $t_{33}$ to time $t_{34}$.

The pulse of the shift gate signal $S_{sh}$ goes high at time $t_{34}$ illustrated in FIG. 3, and the pulse of the light emission time signal $S_{pwm}$ goes low. In response to the pulse fall of the light emission time signal $S_{pwm}$, the electric current $I_{led}$ and the light-quantity instantaneous value $P_{led}$ start falling at time $t_{34}$. The electric current $I_{led}$ falls $I_{pk3}$ over a period from time $t_{34}$ to time $t_{35}$. Similarly, the light-quantity instantaneous value $P_{led}$ falls $P_{pk3}$ over the period from time $t_{34}$ to time $t_{35}$.

More specifically, the LEDs 3a to 3c start stopping lighting at time $t_{34}$ illustrated in FIG. 3 so as to be in the light-off state at time $t_{35}$. Operations from time $t_{36}$ to $t_{39}$ illustrated in FIG. 3 are similar to those from time $t_{32}$ to time $t_{35}$.

Referring to FIG. 3, the light emission time of the LEDs 3a to 3c based on the PWM scheme is the period from a pulse fall of the shift gate signal $S_{sh}$ to a next pulse rise of the shift gate signal $S_{sh}$. However, the light emission time is not limited thereto. The light emission time can be any period so long as the period is from a pulse fall of the shift gate signal $S_{sh}$ to a next pulse rise that depends on the electric-current setting value $i_3$ and longer than the light emission time during normal document scanning, and causes the LEDs 3a to 3c to emit a sufficient quantity of light. Alternatively, the light emission time may be configured to place the LEDs 3a to 3c in a continuously-light-on state, or, put another way, set the pulse of the light emission time signal $S_{pwm}$ continuously high irrespective of a pulse rise of the shift gate signal $S_{sh}$.

Modification of Second Embodiment

Meanwhile, multifunction peripherals (MFPs) are required to be improved in productivity; therefore, it is desired to reduce charge storage time of the CCD 2 of an MFP, or, put another way, to reduce the cycle of the shift gate signal $S_{sh}$. For this reason, the instantaneous value of the quantity of light emitted from the LEDs 3a to 3c of an MFP is generally set high to obtain a sufficient quantity of light. This makes it difficult to reduce glare of light from the LEDs 3a to 3c during pre-scanning.

Figure 4:
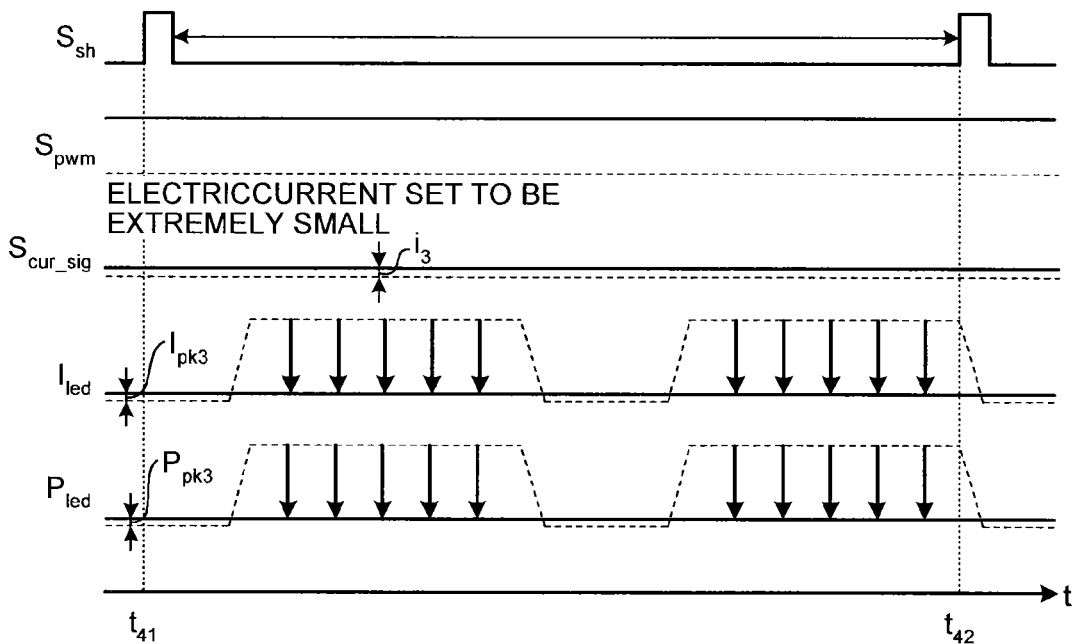
FIG. 4 is a diagram illustrating an example of operations to be performed during pre-scanning by a light-source driving device according to a modification of the second embodiment.

As illustrated in FIG. 4, the electric-current control signal $S_{cur\_sig}$ is set at the electric-current setting value $i_3$ which is sufficiently small during pre-scanning, and the light emission time is configured so as to place the LEDs 3a to 3c in the continuously-light-on state, or, put another way, to set the pulse of the light emission time signal $S_{pwm}$ continuously high. Simultaneously, as illustrated in FIG. 4, the cycle of the shift gate signal $S_{sh}$ is caused to be longer than the cycle of the shift gate signal $S_{sh}$ during normal document scanning illustrated in FIG. 2A. The cycle of the shift gate signal $S_{sh}$ illustrated in FIG. 2A is the period from time $t_{01}$ to time $t_{06}$, while the cycle of the shift gate signal $S_{sh}$ illustrated in FIG. 4 is a period from time $t_{41}$ to $t_{42}$ which is longer than the period from time $t_{01}$ to time $t_{06}$.

The quantity of reflected light, which is emitted onto a to-be-lit subject and reflected from the subject, received by the CCD 2 decreases when the electric-current control signal $S_{cur\_sig}$ is set at the electric-current setting value $i_3$ that is sufficiently small during pre-scanning. Accordingly, the charges stored in the CCD 2 decreases, causing a signal-to-noise (SN) ratio to decrease, which results in false detection of a document size in some cases.

In such a case, the cycle of the shift gate signal $S_{sh}$, the electric-current setting value for setting the electric-current control signal $S_{cur\_sig}$, and a cycle of the light emission time signal $S_{pwn}$ are adjusted so as to make a light quantity per unit time, or, more specifically, an accumulated quantity of light of one line, during normal document scanning equal to that during pre-scanning.

Faulty detection of a document size is prevented and simultaneously glare of light emitted from the LEDs 3a to 3c that dazzles a user during pre-scanning is reduced by making scanning accuracy during normal document scanning substantially equal to that during pre-scanning in this way. In other words, glare of light that dazzles a user during pre-scanning is reduced, while simultaneously image quality of an image obtained by pre-scanning is increased.

As described above, the light-source driving device 1b according to the second embodiment makes the light emission time of the LEDs 3a to 3c based on the PWM scheme during pre-scanning longer than that of the light-source driving device 1a according to the first embodiment. Therefore, a sufficient quantity of light is emitted from the LEDs 3a to 3c during pre-scanning even when the electric-current control signal $S_{cur\_sig}$ based on the current value control is set at the electric-current setting value $i_3$ that is smaller than the electric-current setting value $i_2$. The peak value $P_{pk3}$ of the light-quantity instantaneous value $P_{led}$ of the LEDs 3a to 3c is further reduced, and therefore glare of light from the LEDs 3a to 3c is further reduced.

The light-source driving device 1b according to the second embodiment sets the electric-current control signal $S_{cur\_sig}$ during pre-scanning at the electric-current setting value $i_3$ which is sufficiently smaller than that during normal document scanning even when the luminous intensity of the LEDs 3a to 3c is set high. The light-source driving device 1b sets the light emission time of the LEDs 3a to 3c sufficiently long, thereby assigning longer time to the charge storage time for the CCD 2 than that assigned during normal document scanning. Accordingly, glare of light from the LEDs 3a to 3c is further reduced by reducing the peak value of the LEDs 3a to 3c even when the light-quantity instantaneous value of the LEDs 3a to 3c is set high.

Third Embodiment

A light-source driving device 1c according to a third embodiment of the present invention is described below. In contrast to the light-source driving devices 1a and 1b according to the first and second embodiments, the light-source driving device 1c performs control of switching the electric-current control signal $S_{cur\_sig}$ on or off, thereby causing the electric-current control signal $S_{cur\_sig}$ to contain information about the light emission time signal $S_{pwm}$.

Figure 5:
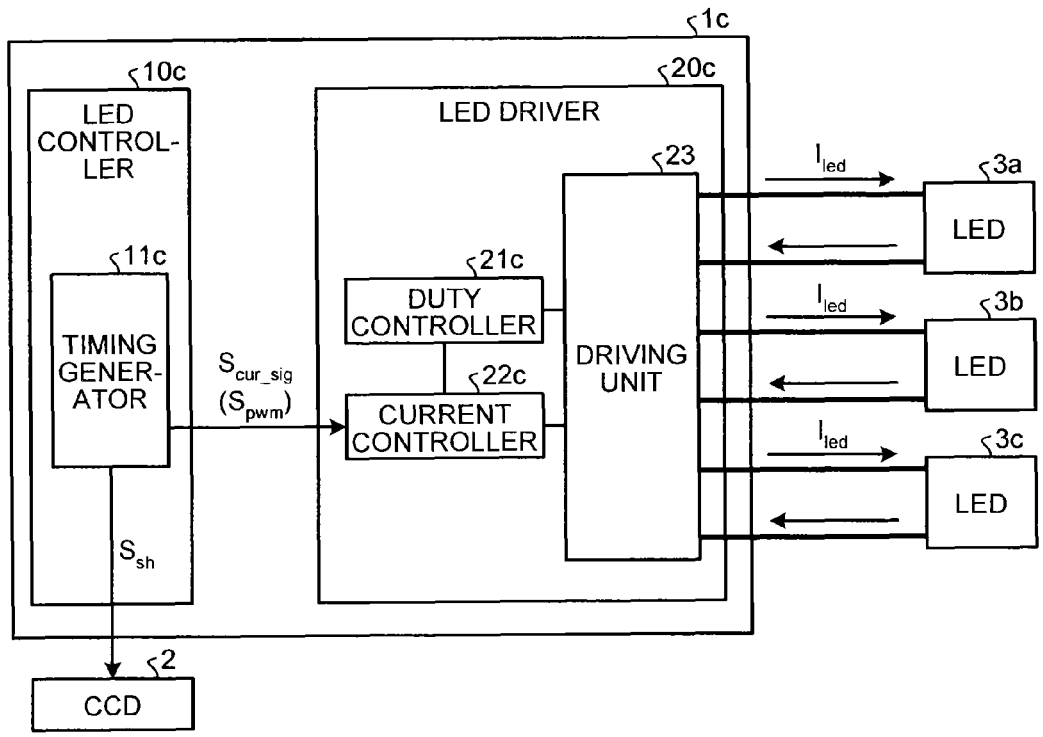
FIG. 5 is a block diagram illustrating an exemplary configuration of a light-source driving device according to a third embodiment of the present invention.

FIG. 5 is a block diagram illustrating an exemplary configuration of the light-source driving device 1c according to the third embodiment. As illustrated in FIG. 5, the light-source driving device 1c includes an LED controller 10c and an LED driver 20c. The CCD 2 and the LEDs 3a to 3c are connected to the light-source driving device 1c.

The LED controller 10c includes a timing generator 11c. The timing generator 11c generates the electric-current control signal $S_{cur\_sig}$ that controls an electric current to be supplied to the LEDs 3a to 3c as an analog signal and outputs it to the LED driver 20c. The timing generator 11c outputs the electric-current control signal $S_{cur\_sig}$ to the LED driver 20c when light is to be emitted from the LEDs 3a to 3c, while the timing generator 11c does not output the electric-current control signal $S_{cur\_sig}$ to the LED driver 20c when light is not to be emitted from the LEDs 3a to 3c.

The LED driver 20c includes a duty controller 21c, a current controller 22c, and the driving unit 23. The current controller 22c includes an analog digital converter (ADC) (not shown) that converts the electric-current control signal $S_{cur\_sig}$ which is the analog signal output from the timing generator 11c into a digital signal.

The current controller 22c converts the electric-current control signal $S_{cur\_sig}$ output from the timing generator 11c from the analog signal into the digital signal. The current controller 22c outputs an electric-current setting value that sets the electric current value to be supplied to the LEDs 3a to 3c using the current value control based on the electric-current control signal $S_{cur\_sig}$ converted into the digital signal to the driving unit 23. The current controller 22c also detects whether or not the electric-current control signal $S_{cur\_sig}$ is output from the timing generator 11c, and outputs on or off of the electric-current control signal $S_{cur\_sig}$ according to a result of the detection.

The duty controller 21c outputs a light-on signal that controls the light emission time of the LEDs 3a to 3c using the PWM scheme based on on and off of the electric-current control signal $S_{cur\_sig}$ output from the current controller 22c to the driving unit 23.

The driving unit 23 controls the light emission time of the LEDs 3a to 3c based on the light-on signal output from the duty controller 21c. The driving unit 23 also controls the light-quantity instantaneous value of the LEDs 3a to 3c based on the electric-current setting value output from the current controller 22c.

As described above, the light-source driving device 1c according to the third embodiment indicates information for controlling the light emission time of the LEDs 3a to 3c based on the PWM scheme by on and off of the electric-current control signal $S_{cur\_sig}$. On and off of the electric-current control signal $S_{cur\_sig}$ output from the timing generator 11c is output to the duty controller 21c via the current controller 22c. The LED driver 20c controls the light emission time of the LEDs 3a to 3c using the PWM scheme based on the electric-current control signal $S_{cur\_sig}$ output from the timing generator 11c to the LED driver 20c, thereby controlling the light-quantity instantaneous value of the LEDs 3a to 3c. Accordingly, a circuit configuration can be simplified because only the electric-current control signal $S_{cur\_sig}$ is output as a control signal from the timing generator 11c to the LED driver 20c.

Fourth Embodiment

A light-source driving device 1d according to a fourth embodiment of the present invention is described below. The light-source driving device 1d causes frequencies of a control clock signal to vary between the PWM scheme and the current value control. The light-source driving device 1d outputs signals obtained by filtering the control clock signals $S_{cur\_ck1}$ and $S_{cur\_ck2}$ of two different frequencies as the light emission time signal $S_{pwm}$ and the electric-current control signal $S_{cur\_sig}$.

Figure 6:
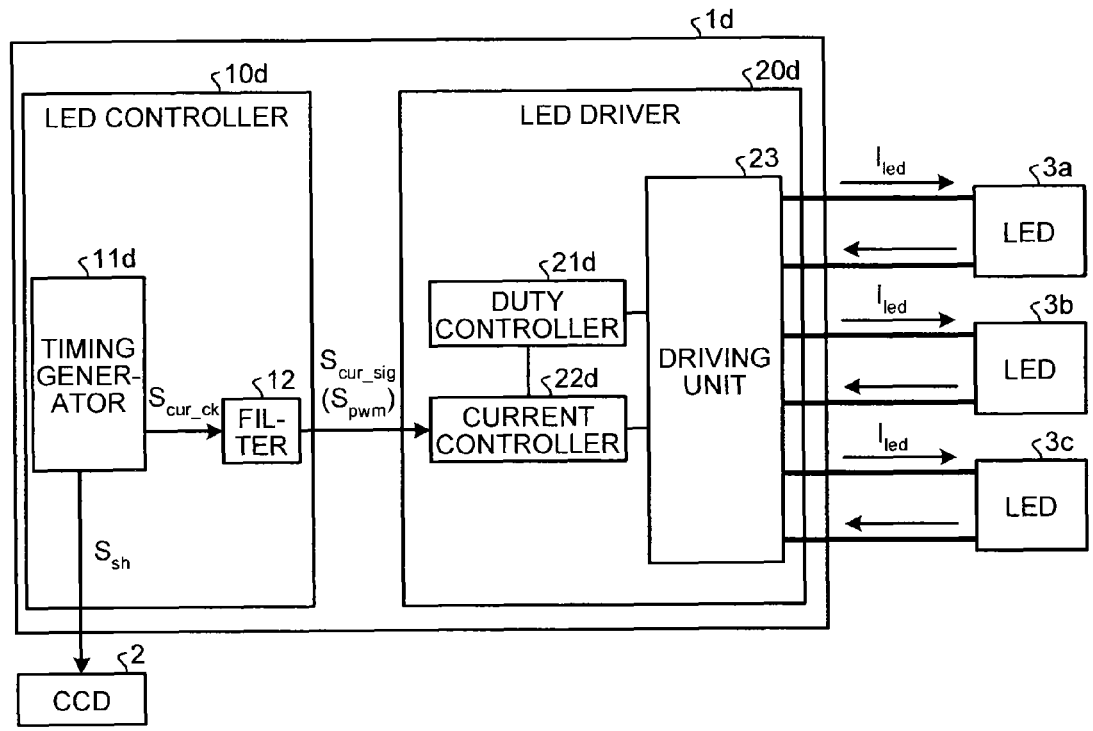
FIG. 6 is a block diagram illustrating an exemplary configuration of a light-source driving device according to a fourth embodiment of the present invention.

FIG. 6 is a block diagram illustrating an exemplary configuration of the light-source driving device 1d according to the fourth embodiment. As illustrated in FIG. 6, the light-source driving device 1d according to the fourth embodiment includes an LED controller 10d and an LED driver 20d. The CCD 2 and the LEDs 3a to 3c are connected to the light-source driving device 1c.

The LED controller 10d includes a timing generator 11d and a filter 12 such as a low-pass filter. The timing generator 11d generates the first control clock signal $S_{cur\_ck1}$ having a first frequency and outputs this signal to the filter 12. The timing generator 11d also generates the second control clock signal $S_{cur\_ck2}$ having a second frequency that is higher than the first frequency and outputs this signal to the filter 12.

The filter 12 is a filter having such cutoff frequency characteristics that permit a signal of which frequency is higher than the first frequency and lower than the second frequency to pass. The filter 12 attenuates the second control clock signal $S_{cur\_ck2}$ to a second filtered intensity and outputs the attenuated signal to the LED driver 20d. The filter 12 outputs the first control clock signal $S_{cur\_ck1}$ at a first filtered intensity that is higher than the second filtered intensity to the LED driver 20d.

Although a low-pass filter is taken as an example of the filter 12, the filter 12 is not limited to a low-pass filter. Any circuit can be employed as the filter 12 so long as the circuit can cause a filtered intensity of an output signal to vary depending on a frequency of an input signal.

The first control clock signal $S_{cur\_ck1}$ passed through the filter 12 is used as the light emission time signal $S_{pwm}$ that controls the light emission time of the LEDs 3a to 3c during document scanning. The second control clock signal $S_{cur\_ck2}$ passed through the filter 12 is used as the electric-current control signal $S_{cur\_sig}$ that controls the light-quantity instantaneous value of the LEDs 3a to 3c during pre-scanning.

The LED driver 20d includes a duty controller 21d, a current controller 22d, and the driving unit 23. The duty controller 21d outputs a light-on signal that controls the light emission time of the LEDs 3a to 3c using the PWM scheme based on the first control clock signal $S_{cur\_ck1}$ output from the current controller 22d to the driving unit 23. The current controller 22d outputs an electric-current setting value that sets the electric current value to be supplied to the LEDs 3a to 3c using the current value control based on the second control clock signal $S_{cur\_ck2}$ output from the filter 12 to the driving unit 23.

Figure 7:
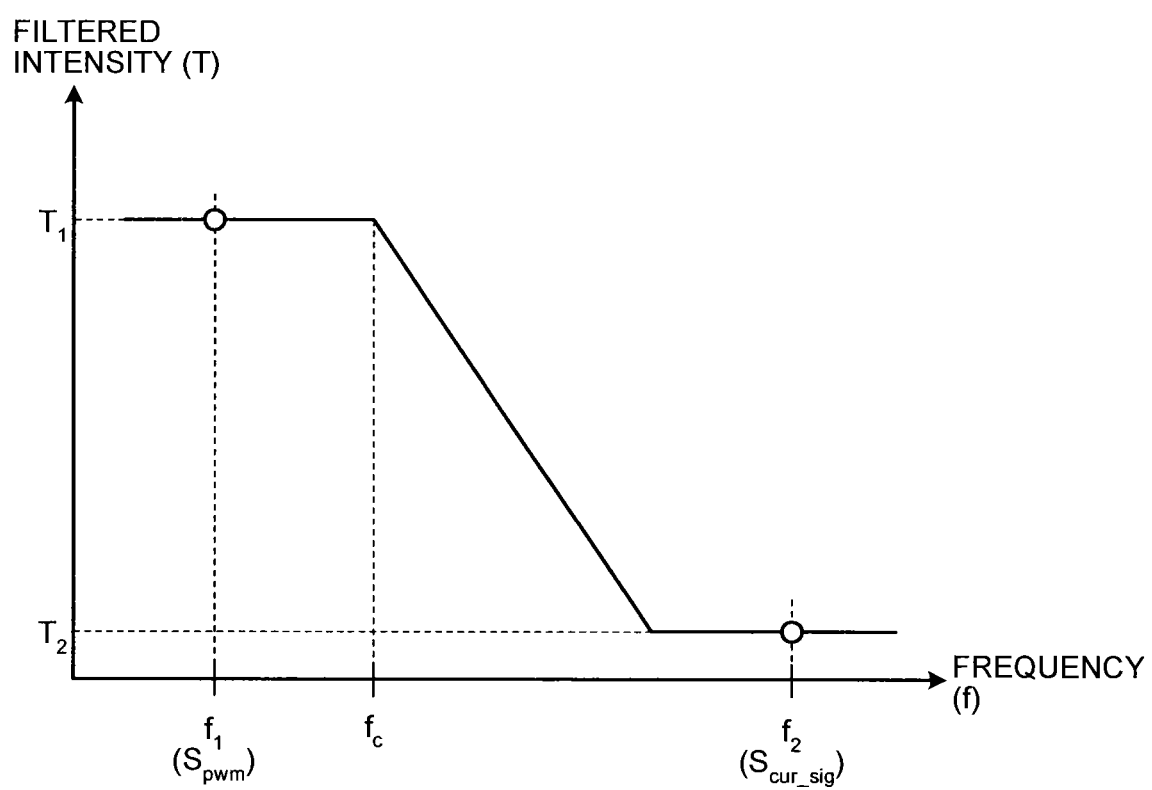
FIG. 7 is a block diagram illustrating an example of characteristics of a filter of the light-source driving device according to the fourth embodiment.

FIG. 7 is a block diagram illustrating an example of characteristics of the filter 12 of the light-source driving device 1d according to the fourth embodiment. As illustrated in FIG. 7, the filter 12 has a cutoff frequency $f_c$. The filter 12 causes the first control clock signal $S_{cur\_ck1}$ having a first frequency $f_1$ that is lower than the cutoff frequency $f_c$ to pass therethrough at a filtered intensity $T_1$. The filter 12 also causes the second control clock signal $S_{cur\_ck2}$ having a second frequency $f_2$ that is higher than the cutoff frequency fc to pass therethrough at a filtered intensity $T_2$ that is lower than the filtered intensity $T_1$.

The first frequency $f_1$ is determined based on the cycle of the shift gate signal $S_{sh}$, or, put another way, the cycle of the charge storage time of the CCD 2; the first frequency $f_1$ is approximately from several to dozens of kHz, for example. Although a pulse edge of the first control clock signal $S_{cur\_ck1}$ becomes less sharp as a result of passing through the filter 12, the first control clock signal $S_{cur\_ck1}$ output from the timing generator 11d functions as the light emission time signal $S_{pwm}$ in the PWM scheme.

The second frequency $f_2$ is approximately from several to dozens of kHz, for example, and adjustable in pulse width. The second control clock signal $S_{cur\_ck2}$ output from the timing generator 11d is attenuated in the filtered intensity by the filter 12 but smoothed by the filter 12. Accordingly, the second control clock signal $S_{cur\_ck2}$ functions as the electric-current control signal $S_{cur\_sig}$ in the current value control. The electric-current control signal $S_{cur\_sig}$ obtained by smoothing the second control clock signal $S_{cur\_ck2}$ is an analog signal that sets the electric-current setting value of the electric current to be supplied to the LEDs 3a to 3c. The electric current to be supplied to the LEDs 3a to 3c is controlled by adjusting the pulse width of the second control clock signal $S_{cur\_ck2}$ to thereby adjust a level of a direct-current voltage of the electric-current control signal $S_{cur\_sig}$.

Figure 8A:
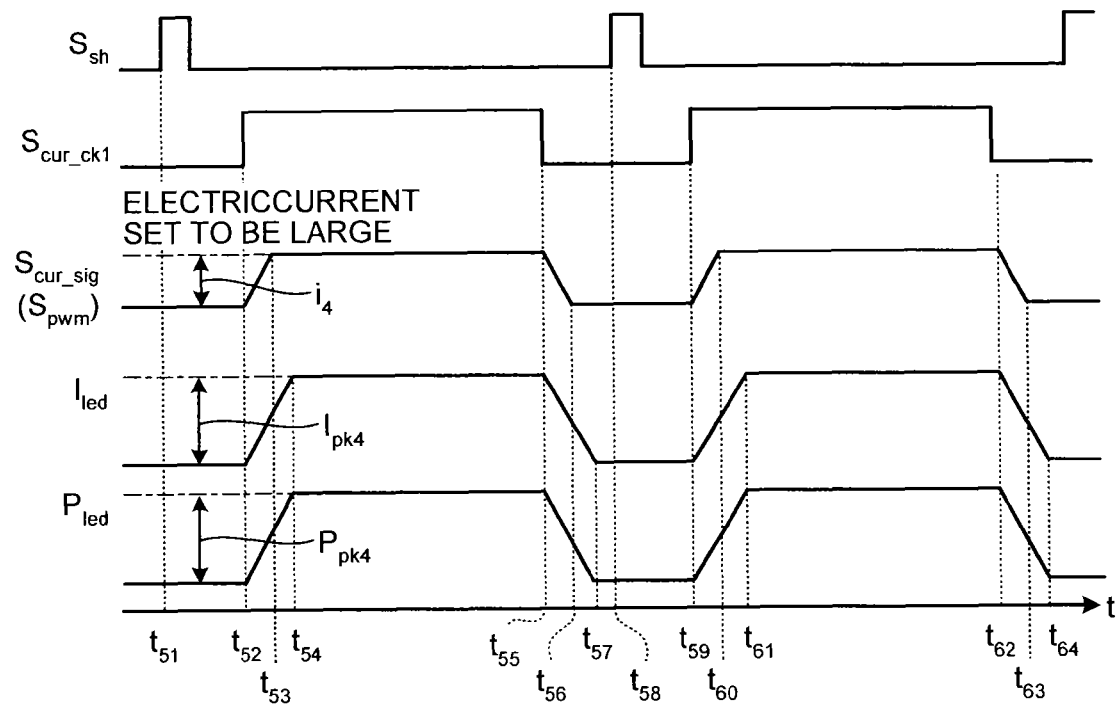
FIG. 8A is a diagram illustrating an example of operations to be performed during normal document scanning by the light-source driving device according to the fourth embodiment.

FIG. 8A is a diagram illustrating an example of operations to be performed during normal document scanning by the light-source driving device 1d according to the fourth embodiment. FIG. 8A is a timing diagram, in which a horizontal axis represents time t, that schematically illustrates the shift gate signal $S_{sh}$, the first control clock signal $S_{cur\_ck1}$, the electric-current control signal $S_{cur\_sig}$, the electric current $I_{led}$, and the light-quantity instantaneous value $P_{led}$ at each time t.

As illustrated in FIG. 8A, before time $t_{51}$, the LEDs 3a to 3c are in the light-off state where the shift gate signal $S_{sh}$, the light emission time signal $S_{pwm}$, the electric current $I_{led}$, and the light-quantity instantaneous value $P_{led}$ are in their initial states during document scanning.

The pulse of the shift gate signal $S_{sh}$ goes high at time $t_{51}$ illustrated in FIG. 8A. Subsequently, a pulse of the first control clock signal $S_{cur\_ck1}$ goes high at time $t_{52}$. In response to the pulse rise of the first control clock signal $S_{cur\_ck1}$, the electric-current setting value indicated by the electric-current control signal $S_{cur\_sig}$, the electric current $I_{led}$, and the light-quantity instantaneous value $P_{led}$ start rising at time $t_{52}$.

The electric-current setting value set as the electric-current control signal $S_{cur\_sig}$ increases an electric-current setting value $i_4$ that depends on the filtered intensity $T_1$ of the first control clock signal $S_{cur\_ck1}$ over a period from time $t_{52}$ to time $t_{53}$. The electric current $I_{led}$ increases $I_{pk4}$ that depends on the filtered intensity $T_1$ of the first control clock signal $S_{cur\_ck1}$ over a period from time $t_{52}$ to time $t_{54}$. Similarly, the light-quantity instantaneous value $P_{led}$ increases $P_{pk4}$ that depends on the filtered intensity $T_1$ of the first control clock signal $S_{cur\_ck1}$ over the period from time $t_{52}$ to time $t_{54}$.

More specifically, the LEDs 3a to 3c start lighting at time $t_{52}$ illustrated in FIG. 8A so as to be in a state where the LEDs 3a to 3c emit light according to $I_{pk4}$ and $P_{pk4}$ at time $t_{54}$. $I_{pk4}$ and $P_{pk4}$ are a peak value of the electric current $I_{led}$ and a peak value of the light-quantity instantaneous value $P_{led}$, respectively, in a state where the electric-current control signal $S_{cur\_sig}$ is set at the electric-current setting value $i_4$. The LEDs 3a to 3c emit light according to $I_{pk4}$ and $P_{pk4}$ for a period from time $t_{54}$ to time $t_{55}$.

The pulse of the first control clock signal $S_{cur\_ck1}$ goes low at time $t_{55}$ illustrated in FIG. 8A. In response to the pulse fall of the first control clock signal $S_{cur\_ck1}$, the electric-current setting value indicated by the electric-current control signal $S_{cur\_sig}$, the electric current $I_{led}$, and the light-quantity instantaneous value $P_{led}$ start falling at time $t_{55}$. The electric-current setting value indicated by the electric-current control signal $S_{cur\_sig}$ falls $i_4$ over a period from time $t_{55}$ to time $t_{56}$. The electric current $I_{led}$ falls $I_{pk4}$ over a period from time $t_{55}$ to time $t_{57}$. Similarly, the light-quantity instantaneous value $P_{led}$ falls $P_{pk4}$ over the period from time $t_{55}$ to time $t_{57}$.

More specifically, the LEDs 3a to 3c start stopping lighting at time $t_{55}$ illustrated in FIG. 8A so as to be in the light-off state at time $t_{57}$. Operations from time $t_{58}$ to $t_{64}$ illustrated in FIG. 8A are similar to those from time $t_{51}$ to time $t_{58}$.

Figure 8B:
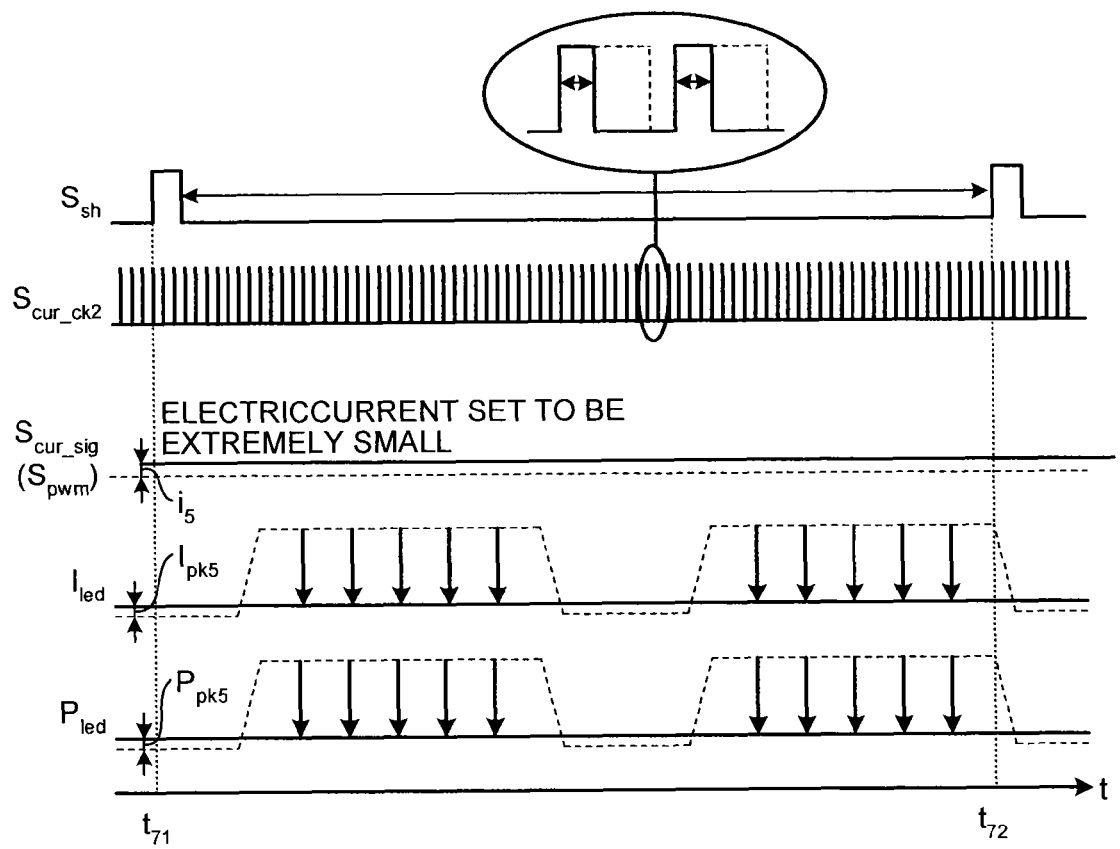
FIG. 8B is a diagram illustrating an example of operations to be performed during pre-scanning by the light-source driving device according to the fourth embodiment.

FIG. 8B is a diagram illustrating an example of operations to be performed during pre-scanning by the light-source driving device 1d according to the fourth embodiment. FIG. 8B is a timing diagram, in which a horizontal axis represents time t, that schematically illustrates the shift gate signal $S_{sh}$, the second control clock signal $S_{cur\_ck2}$, the electric-current control signal $S_{cur\_sig}$, the electric current $I_{led}$, and the light-quantity instantaneous value $P_{led}$ at each time t.

As illustrated in FIG. 8B, a pulse of the second control clock signal $S_{cur\_ck2}$ of which frequency is $f_2$ and of which pulse width is a predetermined value is generated for a full period of time t during pre-scanning. The pulse of the shift gate signal $S_{sh}$ goes high at time $t_{71}$ and time $t_{72}$ illustrated in FIG. 8B.

Responsive to that the second control clock signal $S_{cur\_ck2}$ is attenuated by the filter 12, the electric-current setting value indicated by the electric-current control signal $S_{cur\_sig}$ is continuously set at an electric-current setting value $i_5$ that is considerably smaller than the electric-current setting value $i_4$. The electric current $I_{led}$ has $I_{pk5}$ as its peak value that is considerably smaller than $I_{pk4}$, and the light-quantity instantaneous value $P_{led}$ has $P_{pk5}$ as its peak value that is considerably smaller than $P_{pk4}$ according to the electric-current setting value $i_5$ indicated by the electric-current control signal $S_{cur\_sig}$. The peak value $I_{pk5}$ of the electric current $I_{led}$ and the peak value $P_{pk5}$ of the light-quantity instantaneous value $P_{led}$ are maintained while the pulse of the second control clock signal $S_{cur\_ck2}$ is generated, causing the LEDs 3a to 3c to be continuously lit.

The light-source driving device 1d according to the fourth embodiment uses the first control clock signal $S_{cur\_ck1}$ that controls the light emission time of the LEDs 3a to 3c based on the current value control as described above. The light-source driving device 1d also uses the second control clock signal $S_{cur\_ck2}$ that controls the light-quantity instantaneous value of the LEDs 3a to 3c based on the PWM scheme. Put another way, the light-source driving device 1d selectively uses one of the first control clock signal $S_{cur\_ck1}$ and the second control clock signal $S_{cur\_ck2}$.

The light-source driving device 1d controls the light emission time of the LEDs 3a to 3c using the first control clock signal $S_{cur\_ck1}$ filtered to have the filtered intensity $T_1$ that is higher than the filtered intensity $T_2$. The light-source driving device 1d also controls the light-quantity instantaneous value of the LEDs 3a to 3c using the second control clock signal $S_{cur\_ck2}$ that is attenuated by the filter 12 to the filtered intensity $T_2$ as the electric-current control signal $S_{cur\_sig}$. Put another way, both control of the light emission time of the LEDs 3a to 3c based on the PWM scheme and control of the light-quantity instantaneous value of the LEDs 3a to 3c based on the current value control are performed by changing the frequency of a single clock signal. This leads to simplification of the circuit configuration.

Figure 9:
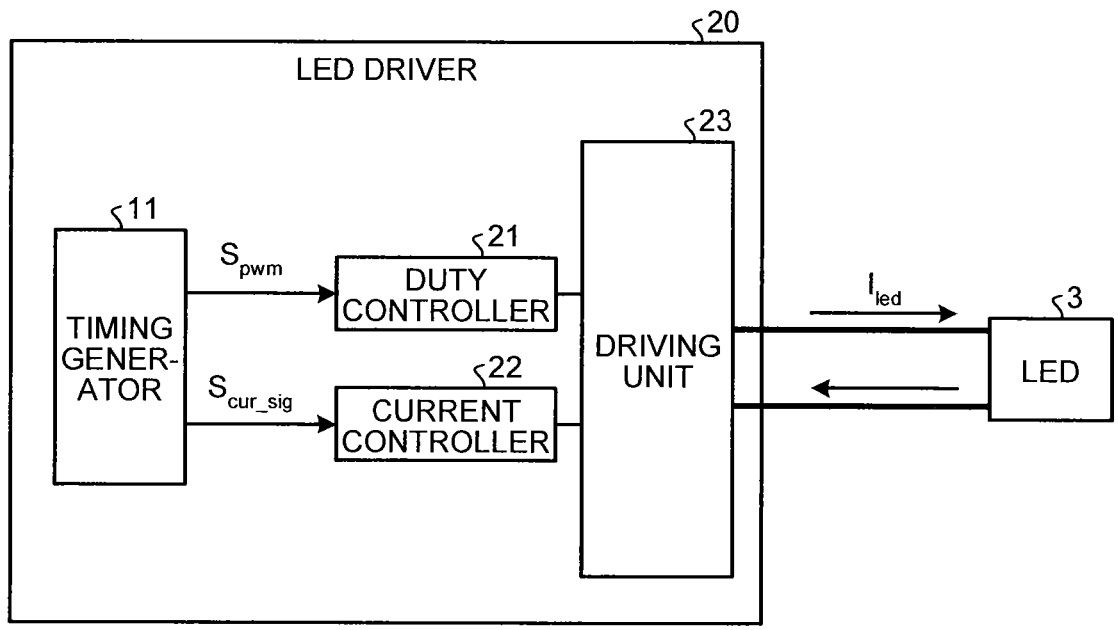
FIG. 9 is a block diagram illustrating an exemplary configuration of a circuit to which any one of the first to fourth embodiments is applied.

FIG. 9 is a block diagram illustrating an exemplary configuration of a circuit to which any one of the first to fourth embodiments is applied. As illustrated in FIG. 9, the first to fourth embodiments are applicable to the LED driver 20 that includes a timing generator 11, a duty controller 21, a current controller 22, and a driving unit 23. An LED 3 is connected to the LED driver 20. The driving unit 23 includes a power source (not shown) and supplies the electric current $I_{led}$ to the LED 3 so that the LED 3 is lit.

The duty controller 21 of the LED driver 20 outputs a light-on signal that controls the light emission time of the LED 3 using the PWM scheme based on the light emission time signal $S_{pwm}$ output from the timing generator 11 to the driving unit 23. The current controller 22 outputs an electric-current setting value that sets an electric current value to be supplied to the LED 3 using the current value control based on the electric-current control signal $S_{cur\_sig}$ output from the timing generator 11 to the driving unit 23.

The driving unit 23 controls the light emission time of the LED 3 according to the light-on signal output from the duty controller 21. The driving unit 23 also controls the light-quantity instantaneous value of the LED 3 based on the electric-current setting value output from the current controller 22.

The configuration of the LED driver 20 illustrated in FIG. 9 is only an example. Alternatively, a configuration in which each of the LED drivers 20a to 20d of the first to fourth embodiments includes a corresponding one of the timing generators 11a to 11d may be employed.

Figure 10:
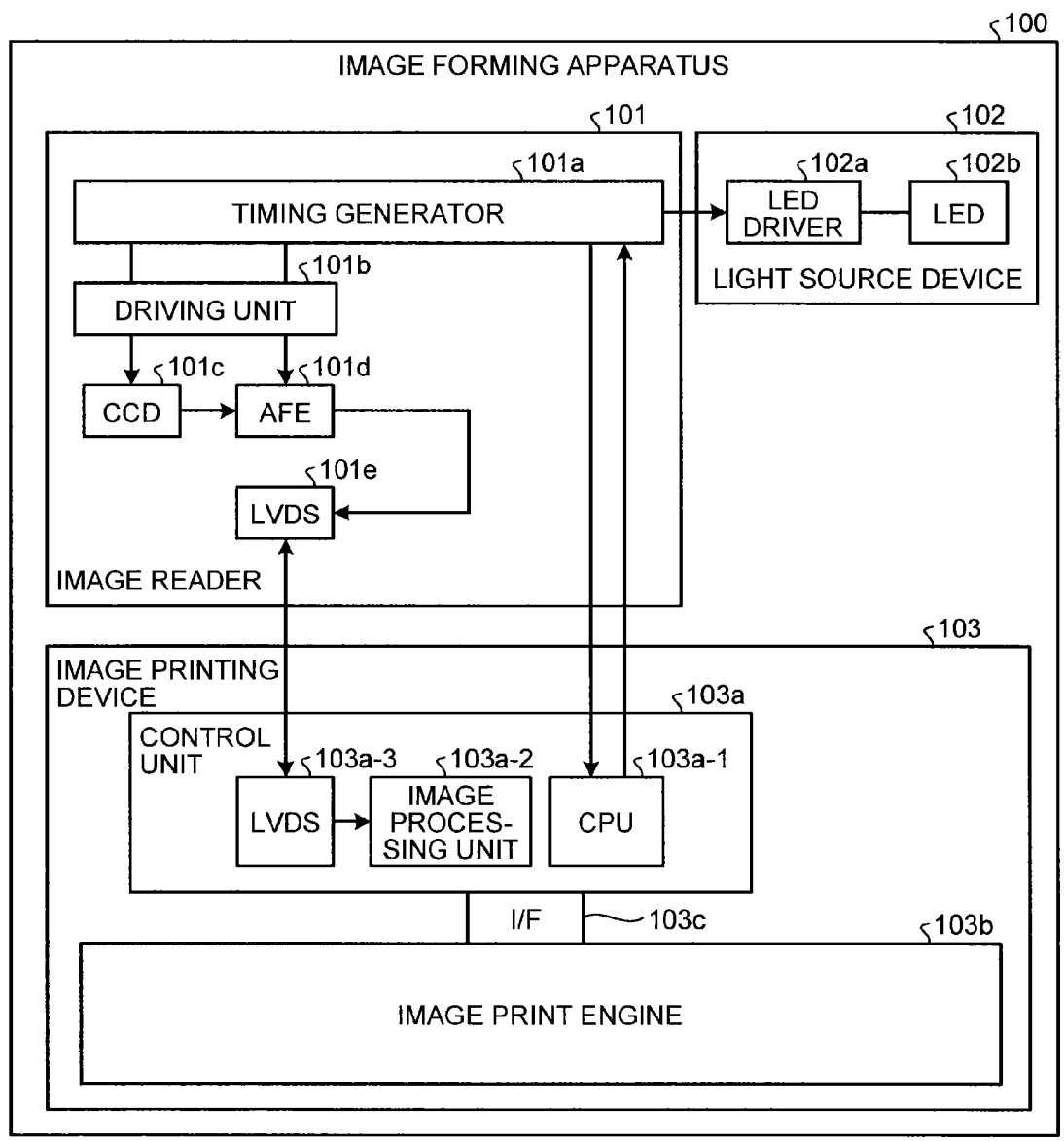
FIG. 10 is a block diagram illustrating an exemplary configuration of an image forming apparatus to which any one of the first to fourth embodiments is applied.

FIG. 10 is a block diagram illustrating an exemplary configuration of an image forming apparatus to which any one of the first to fourth embodiments is applied. An image forming apparatus 100 to which any one of the first to fourth embodiments is applied includes an image reader 101, a light-source device 102, and an image printing device 103.

The image reader 101 includes a timing generator 101a, a driving unit 101b, a CCD 101c, an analog front end (AFE) 101d, and a low voltage differential signaling (LVDS) unit 101e. The light-source device 102 includes an LED driver 102a and an LED 102b. The image printing device 103 includes a control unit 103a, an image print engine 103b, and an interface (I/F) 103c. The control unit 103a of the image printing device 103 includes a central processing unit (CPU) 103a-1, an image processing unit 103a-2, and an LVDS unit 103a-3.

The timing generator 101a generates the light emission time signal $S_{pwm}$ and the electric-current control signal $S_{cur\_sig}$ and outputs the signals to the LED driver 102a of the light-source device 102. The timing generator 101a also generates the shift gate signal $S_{sh}$ and an AFE control signal that controls the AFE 101d, and outputs the signals to the driving unit 101b. The driving unit 101b controls the CCD 101c and the AFE 101d based on the shift gate signal $S_{sh}$ and the AFE control signal, respectively, output from the timing generator 101a.

The CCD 101c generates an analog image signal by receiving reflected light, which is emitted onto an object and reflected from the subject, and converting the received reflected light into electric energy, and outputs the analog image signal to the AFE 101d. The object is a document placed on the image forming apparatus 100, for example. The AFE 101d converts the analog image signal output from the CCD 101c into a digital image signal, and outputs the digital image signal to the image printing device 103 via the LVDS unit 101e. The LVDS unit 101e is an interface that transmits and receives image data as does the LVDS 103a-3.

The LED driver 102a of the light-source device 102 controls the light emission time of the LED 102b based on the light emission time signal $S_{pwm}$ output from the timing generator 101a of the image reader 101, and controls the light-quantity instantaneous value of the LED 102b based on the electric-current control signal $S_{cur\_sig}$. The LED 102b emits light onto the object under control of the LED driver 102a.

The CPU 103a-1 of the control unit 103a of the image printing device 103 controls the entire image printing device 103 and the timing generator 101a. The LVDS unit 103a-3 of the control unit 103a receives an input of the digital image signal output from the image reader 101 via the LVDS unit 101e and outputs the received digital image signal to the image processing unit 103a-2.

The image processing unit 103a-2 of the control unit 103a performs image processing of image data based on the digital image signal output from the LVDS unit 103a-3 and outputs the image-processed image data to the image print engine 103b via the I/F 103c. The image print engine 103b drives a printing unit (not shown), thereby causing the image data output from the image processing unit 103a-2 to be printed on an image forming medium such as paper.

Each of the light-source driving devices 1a to 1d according to the first to fourth embodiments has been described as including a corresponding one of the LED controllers 10a to 10d; however, the configuration of the light-source driving devices 1a to 1d is not limited thereto. More specifically, each of the light-source driving devices 1a to 1d does not necessarily include the corresponding one of the LED controllers 10a to 10d but may be a device that controls light emission from the LEDs 3a to 3c based on the light emission time signal $S_{pwm}$ and the electric-current control signal $S_{cur\_sig}$ or a signal corresponding to these signals input to the device.

The light-source driving device and the image reader described in the first to fourth embodiments may be applied to an MFP that has at least two functions of a copier function, a printer function, a scanner function, and a facsimile function. The light-source driving device and the image reader described in the first to fourth embodiments may be applied to any image forming apparatus such as an MFP, a printer, a scanner, or a facsimile.

According to the embodiments, there is yielded an effect that image quality of an image obtained by normal document scanning is stabilized and simultaneously glare that dazzles a user during pre-scanning is reduced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A light-source driving device comprising:
   driving circuitry configured to drive a light source unit that emits light onto an object; and
   driving control circuitry configured to receive a first constant amplitude electric-current control signal in a first driving mode and a second constant amplitude electric-current control signal in a second driving mode and to control the driving circuitry to drive the light source unit in the first driving mode and the second driving mode,
   wherein a light emission time of the light source unit is controlled in the first driving mode, and an instantaneous value of a quantity of light of the light source unit is controlled in the first driving mode and in the second driving mode, and
   wherein, in the first driving mode, the instantaneous value of the quantity of light of the light source unit is based on the first constant amplitude electric-current control signal, and in the second driving mode, the instantaneous value of the quantity of light of the light source unit is based on the second constant amplitude electric-current control signal.

2. The light-source driving device according to claim 1, wherein
   the light source unit is a light emitting diode,
   the light emission time of the light source unit is controlled using pulse width modulation in the first driving mode, and
   the instantaneous value of the quantity of light of the light source unit is controlled using current value control in the second driving mode.

3. The light-source driving device according to claim 1, further comprising generating circuitry configured to generate the first constant amplitude electric-current control signal in the first driving mode and the second constant amplitude electric-current control signal in the second driving mode for controlling driving of the light source unit, wherein
   the driving control circuitry controls the driving circuitry to drive the light source unit in the first driving mode and the second driving mode based on the first constant amplitude electric-current control signal and the second constant amplitude electric-current control signal, respectively, generated by the generating circuitry.

4. The light-source driving device according to claim 3, wherein
   the generating circuitry is configured to generate a first light emission time signal in the first driving mode and a second light emission time signal in the second driving mode, and
   the driving control circuitry controls the driving circuitry to drive the light source unit in the first driving mode and the second driving mode based on the first light emission time signal and the second light emission time signal, respectively.

5. The light-source driving device according to claim 1, wherein the first driving mode is a normal document scanning mode, and the second driving mode is a pre-scanning mode.

6. The light-source driving device according to claim 1, wherein a constant amplitude of the first constant amplitude electric-current control signal is greater than a constant amplitude of the second constant amplitude electric-current control signal.

7. An image reader comprising:
   a light source unit configured to emit light onto an object;
   driving circuitry configured to drive the light source unit;
   generating circuitry configured to generate a first constant amplitude electric-current control signal in a first driving mode and a second constant amplitude electric-current control signal in a second driving mode for controlling driving of the light source unit;
   driving control circuitry configured to control the driving circuitry to drive the light source unit in the first driving mode and the second driving mode based on the first constant amplitude electric-current control signal and the second constant amplitude electric-current control signal, respectively, generated by the generating circuitry, a light emission time of the light source unit being controlled in the first driving mode, and an instantaneous value of a quantity of light of the light source unit being controlled in the first driving mode and in the second driving mode; and
   photoelectric converter configured to convert an accumulated quantity of reflected light from the object to which the light source unit emits light into electric energy for each of the first driving mode and the second driving mode, the accumulated quantity of light being accumulated during a charge storage time that depends on a corresponding one of the first driving mode and the second driving mode,
   wherein, in the first driving mode, the instantaneous value of the quantity of light of the light source unit is based on the first constant amplitude electric-current control signal, and in the second driving mode, the instantaneous value of the quantity of light of the light source unit is based on the second constant amplitude electric-current control signal.

8. The image reader according to claim 7, wherein
   the light source unit is a light emitting diode,
   the light emission time of the light source unit is controlled using pulse width modulation in the first driving mode, and
   the instantaneous value of the quantity of light of the light source unit is controlled using current value control in the second driving mode.

9. The image reader according to claim 7, wherein a light emission time of the light source unit in the second driving mode is longer than the light emission time in the first driving mode, and the instantaneous value of the quantity of light of the light source unit in the second driving mode is smaller than the instantaneous value of the quantity of light in the first driving mode.

10. The image reader according to claim 7, wherein
    the light source unit continuously emits light in the second driving mode,
    the charge storage time in the photoelectric converter in the second driving mode is longer than in the first driving mode, and the instantaneous value of the quantity of light of the light source unit in the second driving mode is smaller than in the first driving mode.

11. The image reader according to claim 7, wherein the first driving mode and the second driving mode are equal in the quantity of reflected light accumulated during the charge storage time in the photoelectric converter.

12. The image reader according to claim 7, wherein the driving control circuitry controls the driving circuitry based on a first driving signal generated by the generating circuitry to drive the light source unit in the first driving mode, and controls the driving circuitry based on a second driving signal generated by the generating circuitry to dive the light source unit in the second driving mode.

13. The image reader according to claim 7, wherein the driving control circuitry controls the driving circuitry according to on and off of a single driving signal generated by the generating circuitry to drive the light source unit in the first driving mode, and controls the driving circuitry according to an intensity of the single driving signal generated by the generating circuitry unit to drive the light source in the second driving mode.

14. The image reader according to claim 7, further comprising filter circuitry, wherein
the generating circuitry is configured to generate a first driving signal by setting a frequency of the first driving signal, which is variable, to a first frequency and to output the first driving signal to the filter circuitry,
the generating circuitry is configured to generate a second driving signal by setting a frequency of the second driving signal to a second frequency that is higher than the first frequency and to output the second driving signal to the filter circuitry,
the filter circuitry is configured to output the first driving signal generated by the generating circuitry unit to the driving control circuitry so that the first driving signal has a first intensity, and
the filter circuitry is configured to attenuate the second driving signal generated by the generating circuitry to a second intensity that is lower than the first intensity and to output the attenuated second driving signal to the driving control circuitry.

15. The image reader according to claim 14, wherein the first driving signal output from the filter circuitry corresponds to a light emission time signal, and the second driving signal output from the filter circuitry corresponds to one of the first constant amplitude electric-current control signal and the second constant amplitude electric-current control signal.

16. An image forming apparatus comprising the image reader according to claim 7.

17. The image reader according to claim 7, wherein
the generating circuitry is configured to generate a first light emission time signal in the first driving mode and a second light emission time signal in the second driving mode, and
the driving control circuitry controls the driving circuitry to drive the light source unit in the first driving mode and the second driving mode based on the first light emission time signal and the second light emission time signal, respectively.

18. The image reader according to claim 7, wherein the first driving mode is a normal document scanning mode, and the second driving mode is a pre-scanning mode.

19. The image reader according to claim 7, wherein a constant amplitude of the first constant amplitude electric-current control signal is greater than a constant amplitude of the second constant amplitude electric-current control signal.

20. A light-source driving method performed by an image reader, the light-source driving method comprising:
generating a first constant amplitude electric-current control signal in a first driving mode and a second constant amplitude electric-current control signal in a second driving mode to control driving of a light source unit of the image reader, the light source unit emitting light onto a document;
performing driving control by controlling driving circuitry of the image reader based on the first constant amplitude electric-current control signal and the second constant amplitude electric-current control signal generated to drive the light source unit in the first driving mode and the second driving mode, respectively, a light emission time of the light source unit being controlled in the first driving mode, and an instantaneous value of a quantity of light of the light source unit being controlled in the first driving mode and in the second driving mode; and
performing photoelectric conversion by converting an accumulated quantity of reflected light from the document to which the light source unit emits light into electric energy for each of the first driving mode and the second driving mode, the accumulated quantity of light being accumulated during a charge storage time that depends on a corresponding one of the first driving mode and the second driving mode,
wherein, in the first driving mode, the instantaneous value of the quantity of light of the light source unit is based on the first constant amplitude electric-current control signal, and in the second driving mode, the instantaneous value of the quantity of light of the light source unit is based on the second constant amplitude electric-current control signal.

* * * * *